Nov. 21, 1933.   J. V. GIESLER   1,936,329
REGULATOR FOR HEATING PLANTS
Filed Dec. 28, 1931
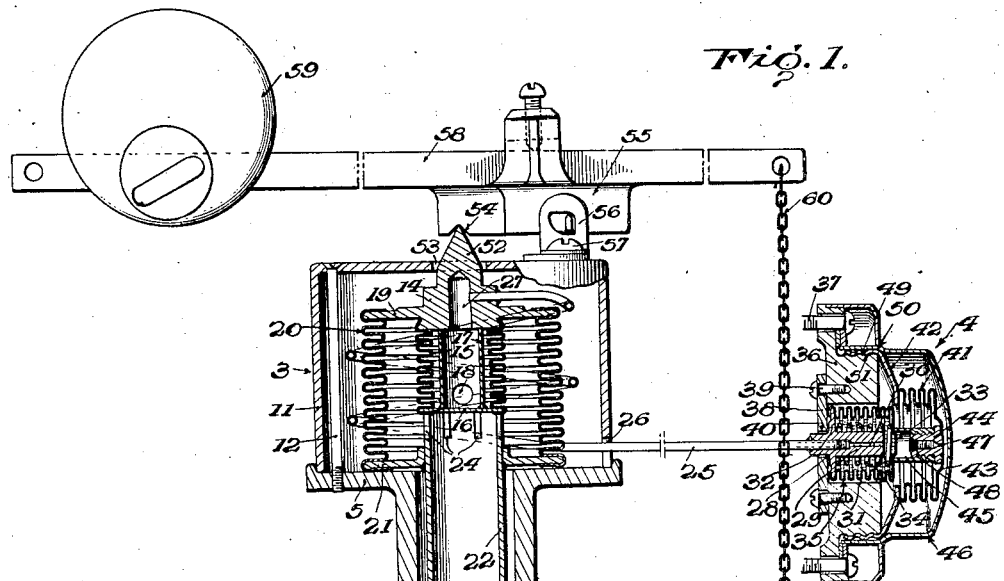
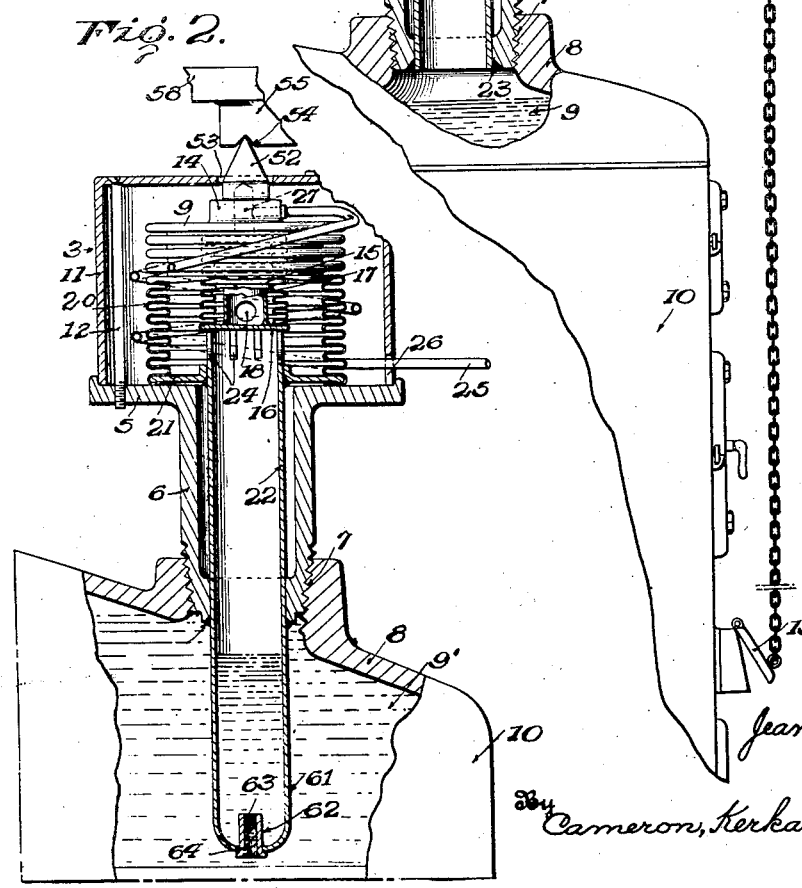
Inventor
Jean V. Giesler
By Cameron, Kerkam & Sutton
Attorneys Patented Nov. 21, 1933

1,936,329

UNITED STATES PATENT OFFICE 1,936,329

REGULATOR FOR HEATING PLANTS

Jean V. Giesler, Knoxville, Tenn., assignor to The Fulton Syphon Company, Knoxville, Tenn., a corporation of Delaware Application December 28, 1931
Serial No. 583,560

21 Claims. (Cl. 236—9)

This invention relates to control devices for heating plants, and more particularly to devices of this character wherein the operation of the furnace is automatically controlled in accordance with variations in both the temperature of the enclosure being heated and the temperature or pressure of the heating medium.

It is one of the objects of the present invention to provide an improved control device for automatically governing the operation of a heating plant which is novel and compact in structure, quickly and easily installed, and efficient and dependable in operation.

Another object is to provide a control device of novel construction for automatically operating the dampers or other mechanism of a furnace in accordance with variations in both the temperature of the enclosure being heated and the temperature or pressure of the heating medium.

A further object is to provide a novel control device of this character wherein the movements of a single actuating member are controlled by the expansion and contraction of a plurality of elements in a motor each of which is responsive to the temperature or pressure variations at different points in the heating system.

Another object of the present invention is to provide a novel control device for automatically controlling the operation of a heating plant in which a thermostat for normally controlling the plant in accordance with changes in temperature of the enclosure to be heated is governed in its operation by the condition of the heating medium.

Still another object is to provide an automatic control device for the dampers or other mechanisms of a furnace by which the motor for regulating the dampers or other mechanisms is actuated by the variations in pressure of different mediums, the pressure of each medium being in turn dependent upon changes in either the temperature of the enclosure being heated or the temperature or pressure of the heating medium, respectively.

A still further object is to provide a novel control device of the character described, actuated by a motor wherein the expansion and contraction of an actuating medium within the motor is partially governed by the temperature of another actuating medium within the motor.

Another object is to provide an automatic control system for a heating plant which embodies an expansible and contractible motor for actuating the dampers or other regulating mechanism of the furnace, and new and improved temperature responsive means for actuating said motor.

These and other objects will appear more fully from a consideration of the detailed description of the invention which follows. Although only two embodiments of the invention have been described and illustrated in the accompanying drawing, it will be expressly understood that this drawing is for the purpose of illustration only and is not to be construed as a limitation of the scope of the invention, reference being had for this purpose to the appended claims.

In the drawing, wherein like reference characters indicate like parts throughout the several views:

Fig. 1 is a sectional side view of one embodiment of a regulating system embodying the present invention, with certain parts of the heating system shown in full, and adapted for use with a steam furnace; and Fig. 2 is a view similar to Fig. 1 of another embodiment of the present invention adapted for use with a hot water furnace.

Referring now to Fig. 1, there is disclosed therein, by way of example, a novel control device for automatically operating a regulating mechanism for controlling the dampers and draft of a steam heating furnace, embodying a novel motor which is actuated by variations in the temperature of the enclosure being heated and the temperature or pressure of the heating medium in the boiler. As illustrated, the general arrangement consists of two units located at different points in the heating system, one of the units generally indicated at 3 including a motor element and a maximum-minimum thermostat subjected to the temperature and pressure of the heating medium while the other unit generally indicated at 4 consists of a thermostatic element for normally controlling the motor in accordance with changes in the temperature of the ambient to be controlled and located at any desired place within the enclosure being heated; connecting means being provided between the two units.

In the embodiment shown, the motor and thermostat unit 3 comprises a base plate or support 5 having a downwardly extending central boss 6 preferably formed integrally therewith, said boss being externally threaded as at 7 for engagement with the wall 8 of steam drum 9 of the boiler 10, and a suitable casing 11 which is secured to base plate 5 in any desired manner as by screws 12 and within which is housed the mechanism for actuating one or more dampers or draft doors 13 of boiler 10.

The novel motor housed within the casing 11 comprises a vertically movable head or end member 14 to the bottom of which an expansible and contractible member 15 is suitably secured. The expansible and contractible member 15 is illustrated in the form of a bellows with the upper end soldered to the movable head 14 and the lower end similarly secured to the bottom closure plate or head 16. Bottom closure plate 16 is also provided with a suitable stop for limiting the collapsing action of bellows member 15 which may be in the form of a hollow sleeve or tube 17 having a suitable opening 18 in the side thereof to provide free communication with the inside of bellows member 15. Head or end member 14 is also provided with a suitable flange 19 to which is secured another expansible and contractible member, illustrated in the form of a larger bellows 20 surrounding the first bellows 20, the bellows being secured to the flange 19 at the upper end and secured at its bottom end to a fixed closure plate or head 21 which is secured in any desired manner to a suitable support. The members 15 and 20 constitute the motor elements of an actuating mechanism, and either of said motors may be connected to a source of control from the temperature of the ambient while the other is connected to a source of control from the heating medium. Preferably the outer member 20 is connected to a maximum and minimum thermostat shown in this embodiment as composed of said bellows 20 and a vertical tube 22 extending downwardly within and throughout the length of boss 6 and into the steam space of the boiler, said tube being suitably secured to the boss 6 at its lower end as by soldering at 23.

The bellows 20 and the tube 22 constitute a thermostat for actuating the regulating mechanism in accordance with the temperature and pressure conditions of the heating medium in the drum 9. To this end the tube 22 is open at its lower end to the interior of steam drum 9 of boiler 10 and, although normally closed at its upper end by the bottom closure plate 16 of inner bellows member 15, is provided with a plurality of circumferentially spaced openings 24 which provide free communication between the inside of tube 22 and the inside of outer bellows member 20. Since tube 22 is open at its lower end to the steam in drum 9, it will be apparent that upon increases in temperature or pressure of the steam in the drum 9 the pressure will be correspondingly increased and exerted within outer bellows member 20 against the bottom of flange 19 which will tend to impart vertical movement to head or end member 14 in accordance with variations in the temperature and pressure of the heating medium.

Novel means are also provided for actuating head or end member 14 in accordance with variations in the temperature of the enclosure being heated at the point where thermostatic element 4 is installed. As shown, thermostatic element 4 is connected to actuating element 3 of the control device by means of a suitable tube 25 which is preferably flexible and which passes through an opening 26 adjacent the bottom of casing 11, and helically encircles outer bellows member 20 of the motor to insure sufficient flexibility of said tube to permit vertical movement of head or end member 14. The end of said tube is secured in communication with a countersunk recess 27 within member 14 and is in turn in communication with the interior of the hollow sleeve stop member 17 and of inner bellows member 15. The other end of tube 25 is suitably secured as by threads 28 to a head member 29, and is in communication through a constricted axial conduit 30 formed in said head member 29 with the interior of an expansible and contractible bellows member 31, one end of which is suitably secured to a flange 32 formed integrally with head member 29 while at its opposite end it is provided with a movable head 33 preferably formed integrally therewith. Bellows member 31 is also provided with a compression spring 34 which is seated between flange 32 and movable head 33 and continually tends to expand said bellows. Bellows member 31 and head members 29 and 33 are removably housed within a central opening 35 in the base 36 of thermostatic element 4 which is adapted to be secured at any desired location within the enclosure being heated as by screws 37, and are held in proper position within opening 35 by means of a clip or strap 38 secured to base 36 as by a screw 39 about which it is rotatable and having a suitable slotted opening 40 which is adapted to embrace the inner end of head member 29 and by its contact with the inner face of flange 32 maintain said parts within opening 35. These parts may be readily removed from opening 35 by merely swinging clip 38 around screw 39 until said clip is clear of flange 32.

Bellows member 31, conduit 30 and flexible tube 25 comprise a portion of a sealed system and are normally filled with a quantity of a suitable liquid vaporizable at a predetermined minimum temperature to which the bellows 15 of the motor is subjected by steam in the boiler 10, and in such amount that upon movement of movable head 33 to the left, as viewed in the drawing, which compresses bellows member 31, a small portion of said vaporizable liquid is forced into countersunk recess 27, hollow sleeve stop member 17, and through opening 18 into inner bellows member 15. The operation of the bellows member 15 of the motor is governed by the temperature of the heating medium within the bellows 20 and surrounding the bellows 15, and only when the temperature is above a predetermined minimum will the vaporizable liquid injected into the bellows 15 be vaporized and actuate the same. If the temperature of the motor is below a predetermined minimum the liquid injected into the bellows 15 will have no effect. However if the temperature of the motor is above a predetermined minimum the injected liquid is then vaporized by the heat of the steam in outer bellows member 20 surrounding inner bellows member 15, and, with bottom closure plate or head 16 abutting the top of vertical tube 22, expansion of inner bellows member 15 due to the vapor pressure thus created forces head or end member 14 upward. Movement of movable head 33 to the right, however, with a consequent extension of bellows member 31, creates a partial vacuum in the end of flexible tube 25 in communication with countersunk recess 27 and draws some of the vapor from within inner bellows member 15 into tube 25 wherein it is condensed, thereby decreasing the vapor pressure within inner bellows member 15 and allowing head or end member 14 to move downward.

In order that the movement of movable head 33 may follow the variations in temperature of the enclosure being heated at the place where thermostatic element 4 is located, suitable thermostatic means are provided for actuating movable head 33 in accordance with changes in temperature. In the embodiment shown, an expansible and collapsible bellows member 41 is provided substantially coaxial with movable head 33 of bellows member 31, the inner end of bellows member 41 being soldered or otherwise suitably secured to an annular plate or head 42, while the opposite end of said bellows is preferably made integral with or has secured thereto a movable head 43 which has a filling plug 44 and carries on its inner face a tubular extension 45 shown as threaded thereto which is adapted to abut movable head 33. Annular plate or head 42 is soldered or otherwise suitably secured at its outer periphery to a cup-shaped casing 46 which also totally encloses bellows member 41 and its movable head 43. The space between casing 46 and bellows member 41 is preferably entirely filled with an expansible, although not necessarily volatile, liquid through an opening 47 in filling plug 44, and is retained therein by means of a sealing plug and solder 48. The volume of liquid contained in this space tends to increase or decrease with temperature changes, which expansion or contraction is communicated from bellows member 41 through tubular extension 45 to the movable head 33 of bellows member 31.

Upon an increase in temperature at the location of thermostatic element 4, the fluid within the space between casing 46 and bellows member 41 expands, collapses bellows 41, movement of the latter in turn collapses bellows member 31, and a small quantity of the vaporizable liquid is forced into hot inner bellows member 15 of the motor wherein it is vaporized, increases the pressure therein and moves head or end member 14 upward. Likewise, a decrease in temperature at thermostatic element 4 causes a contraction or decrease in volume of the liquid within casing 46, allows bellows member 41 to expand releasing the pressure of tubular extension 45 against movable head 33, and allows compression spring 34 to extend bellows member 31 and draw some of the vapor from within inner bellows member 15 of the motor into tube 25 wherein it is condensed, the reduced vapor pressure allowing head or end member 14 to move downwardly.

In order to make thermostatic element 4 adjustable for operation at various temperatures, suitable means have been provided for causing movable head 43 of bellows member 41 to move a greater or less distance before tubular extension 45 comes into contact with movable head 33. As shown, this result is accomplished by forming a screw thread 49 on the outer flange 50 of annular plate 42 which screw thread engages a similar thread 51 on base plate 36 of thermostatic element 4 so that rotation of casing 46 will cause tubular extension 45 to approach or recede from movable head 33 thereby requiring a greater or less change in temperature before said tubular extension comes into contact with and forces movable head 33 to move.

Suitable regulating mechanism is provided for transmitting the movement of head or end member 14 of the motor to the dampers or draft doors 13 of boiler 10 so as to automatically regulate the operation of the furnace in accordance with variations in the temperature of the enclosure being heated at such places as thermostatic element 4 may be installed and in the pressure of the steam generated within drum 9 of boiler 10. In the form shown, head or end member 14 is provided at its upper end with a vertical, knife-edged extension 52 which extends upwardly through a suitable opening 53 in casing 11 and engages a knife-edged slot 54 formed in the bottom surface of a rocker 55 which is pivotally mounted upon suitable rocker brackets 56 secured to casing 11 as by screws 57. Rocker 55 has secured thereon lever bar 58, one end of which is provided with an adjustable counterweight 59 while the other end is suitably secured as by a chain 60 to damper or draft door 13.

The operation of the control device just described is as follows: When the enclosure being heated is so cold in the vicinity of thermostatic element 4 as to require heat from the heating plant, bellows members 41 and 31 are fully expanded, all of the volatile liquid in the sealed system comprising bellows 31, tube 25 and the space inside of inner bellows member 15 is withdrawn into tube 25 and bellows member 31, and inner bellows member 15 is contracted. The control device then operates as a pressure-operated damper regulator only in that as steam is generated in steam drum 9 of boiler 10, it passes upward through vertical tube 22, openings 24, and into the space within outer bellows member 20 and surrounding inner bellows member 15. As the pressure of the steam increases, outer bellows member 20 is expanded and head or end member 14 moves upward through opening 53 thereby rotating lever bar 58 about its pivot in rocker bracket 56 and gradually closing the damper or draft door 13. It will be understood that this damper closing mechanism may be suitably adjusted so as to completely close off the draft to the fire in the furnace when the steam pressure reaches a predetermined maximum or danger point. Should the steam pressure drop, the pressure is decreased within outer bellows member 20, head or end member 14 descends through opening 53, and the damper or draft door 13 is again opened. It will be understood that during this phase of operation, inner bellows member 15 is fully contracted, is bodily raised and lowered by the movement of head or end member 14, and has no effect upon the movement of the latter.

As the enclosure at the vicinity of thermostatic element 4 is gradually warmed and increases in temperature, the expansible fluid within casing 46 gradually increases in volume, compressing bellows member 41 and moving tubular extension 45 toward movable head 33 of bellows member 31. When the temperature is reached at which thermostatic element 4 is adjusted to operate, tubular extension 45 forces movable head 33 inwardly to the left, as viewed in the drawing, and forces a few drops of volatile liquid down through sleeve stop member 17 into inner bellows member 15 wherein it is vaporized by the heat of the steam surrounding said inner bellows member when the temperature of such steam is above a predetermined minimum. The pressure of the vapor thus generated is exerted first against bottom closure plate or head 16 and forces it downwardly until it abuts the top of tube 22, and any further increase in pressure thereafter expands inner bellows member 15 so as to force head or end member 14 upwardly and close the damper or draft door 13 as previously described. Likewise, when the temperature falls adjacent thermostatic element 4, bellows members 41 and 31 are again expanded, some of the vapor within inner bellows 15 is withdrawn into tube 25 and condensed therein, and the pressure within said inner bellows member thus decreased so as to permit contraction of the bellows and lowering of head or end member 14 with a consequent reopening of the drafts or dampers.

It is to be noted that with the novel regulating device thus provided, total extinguishment of the fire in boiler 10 is prevented during periods of warm weather which may occur during the time that the heating plant is in operation. This result is accomplished due to the fact that thermostatic element 4 is not effective to control the actuation of damper or draft door 13 unless steam is being generated in drum 9 of boiler 10, and the temperature within the bellows 20 is at a sufficiently high temperature to vaporize the liquid in bellows 15. Thus, if, due to a period of warm weather, the temperature of the enclosure in which the heating plant is installed rises to the point where thermostatic element 4 operates in the manner previously described to close the drafts to boiler 10, the drafts will not remain closed until the fire in the boiler is completely extinguished because, when the boiler ceases to generate sufficient steam to vaporize the volatile liquid within inner bellows member 15, the vapor pressure within said bellows member is lost, the bellows contracts, and head or end member 14 is lowered so as to open the drafts and revive the fire in the furnace until steam is again produced and the vaporizable liquid in inner bellows member 15 again vaporized to close the drafts. This intermittent operation of the drafts during warm weather thus effectively prevents total extinguishment of the fire in the furnace.

Referring now to Fig. 2, there is shown therein a modification which can be made in actuating element 3 so as to adapt the regulating device of the present invention for operation with a hot water furnace. As shown, vertical tube 22 is extended downwardly below soldering 23 and provided with a rounded end portion 61 in which is secured a filling plug 62 thus forming a casing or bulb which is adapted to be charged with a volatile liquid through an opening 63 in filling plug 62, said opening being sealed as by a suitable sealing plug and solder 64. The bulb thus formed extends into the interior of the hot water drum 9' in contact with the water therein. As the water in drum 9' is heated by the fire in the furnace, the volatile liquid in bulb portion 61 is vaporized, the vapor passing upwardly through vertical tube 22, openings 24, and into the space between outer bellows member 20 and inner bellows member 15. When the temperature of the water in drum 9' reaches a predetermined point, the pressure of the vapor becomes sufficient to expand outer bellows member 20 and raise inner end member 14 and the temperature is also sufficient to vaporize the liquid in the bellows 15 in the same manner as was previously described for a steam boiler. Likewise, on cooling of the water within drum 9' below the danger point, the vapors within outer bellows member 20 and vertical tube 22 are condensed, the pressure is decreased, and the bellows contract, lowering head or end member 14 so as to reopen the drafts, and the bellows 15 becomes inoperative. The structure and mode of operation of this modification of the regulating device is the same as that previously described and further description is thought unnecessary.

There is thus provided by the present invention a novel regulating device for governing the operation of a heating plant in accordance with variations in both the temperature of the enclosure being heated and the temperature or pressure of the heating medium and which comprises a pair of rugged and compact elements which may be readily and easily installed at two different points in the heating system and connected in a suitable manner so as to function efficiently and dependably for the purpose intended. The actuating element of the device derives its motive force from the expansion or contraction of one or both of two bellows members, each of which is subject to the pressure of a separate medium, the pressure of each medium being in turn dependent upon the temperature of the heating medium of the heating system. The regulating device thus provided is especially adapted to close the dampers or draft doors of the furnace when either the temperature of the enclosure being heated attains a predetermined degree or the temperature or pressure of the heating medium within the boiler approaches the danger point, and is equally well adapted for use with either steam or hot water furnaces. Also, this regulating device is so constructed as to prevent total extinguishment of the fire in the furnace during periods of warm weather due to the fact that the operation of the bellows member controlled by variations in the temperature of the enclosure being heated is also dependent upon the temperature of the heating medium. The invention also includes a novel form of temperature responsive actuating system which is continuously automatic in its operation and, unlike those devices embodying electrical circuits, requires no auxiliary equipment such as batteries nor the personal attendance and supervision which such systems necessitate.

It will be obvious that the invention is not limited to the forms shown in the drawing, but is capable of a variety of mechanical embodiments. For example, any suitable type of damper or draft door operating mechanism may be substituted for the specific form shown and described, or, if desired, the regulating device of the present invention may be employed for controlling the operation of the electric motor of an oil burner, a blower, an automatic stoker or any other of the various devices which govern the heating action of a heating plant. Also, it will be understood that a plurality of thermostatic elements may be connected in parallel to a common actuating element instead of the single thermostat shown. Likewise, any other suitable thermostatic elements capable of functioning in the same manner as the one disclosed may be employed in the place thereof. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In a control device for a heating apparatus, a regulating mechanism for the apparatus, a thermostat for normally controlling the regulating mechanism in accordance with the conditions of the ambient, said thermostat including means which can operate only above a predetermined minimum temperature, and a second means for actuating the regulating mechanism in accordance with conditions in the apparatus, said last named means including means for heating a portion of said thermostat to said predetermined minimum temperature.

2. In a control device for a heating apparatus, a regulating mechanism for the apparatus, a vapor pressure thermostat for normally controlling the regulating mechanism in accordance with the conditions of the ambient and including a vaporizable actuating fluid, and a second means for actuating the regulating mechanism when the temperature of the heating medium in the apparatus is above a predetermined maximum, said second named means providing the heat to vaporize a portion of said fluid and render said thermostat effective when the temperature of the heating medium in the apparatus is above a predetermined minimum.

3. In a control device for the furnace of a heating plant, a regulating mechanism controlling the draft of the furnace normally biased to a position in which the draft is open, a thermostat for controlling the regulating mechanism to vary the draft in the furnace inversely with changes in temperature of the ambient, and means for acuating the regulating mechanism to close the draft when the temperature of the heating medium in the furnace is above a predetermined maximum, said last named means conditioning the thermostat to control the regulating mechanism only when the temperature of the heating medium in the apparatus is above a predetermined minimum.

4. In a control device for a heating apparatus, a motor for regulating the apparatus, means for subjecting the motor to the temperature of the heating medium in the apparatus and adapted to actuate the control device when the temperature of the heating medium exceeds a predetermined maximum, and a thermostat for controlling the motor in accordance with the temperature of the ambient to be controlled when the temperature of the motor is above a predetermined minimum.

5. In a control device for a heating plant, regulating mechanism for controlling the effect of the heating plant, a plurality of thermostats for actuating said regulating mechanism, one of said thermostats controlling the regulating mechanism in accordance with the temperature condition of the ambient to be controlled and the other of said thermostats controlling the regulating mechanism in accordance with the temperature condition of the heating medium, the thermostats being so constructed and arranged that the first named thermostat is dependent in its operation upon a condition in the second named thermostat at which the temperature of the heating medium is above a predetermined minimum.

6. In a control device for a heating plant, regulating mechanism for controlling the effect of the plant, a plurality of thermostats for actuating said regulating mechanism, one of said thermostats normally controlling the regulating mechanism in accordance with the temperature conditions of the ambient, the other of said thermostates governing the operation of the first named thermostat by conditioning the same only when the temperature of the heating medium is above a predetermined minimum and actuating the regulating mechanism when the temperature of the heating medium is above a predetermined maximum.

7. In a control device for a heating plant, regulating mechanism for controlling the effect of the heating plant, an expansible and contractible motor for actuating the regulating mechanism, an expansible and collapsible chamber surrounding the motor and operatively connected to said regulating mechanism, means for transmitting heat from the heating medium to the chamber, and a thermostat for controlling the motor when the temperature of the motor is above a predetermined minimum but ineffective to actuate said motor when the temperature of the motor is below the predetermined minimum.

8. In a control device for a heating plant, regulating mechanism for controlling the effect of a heating plant, an expansible and contractible motor for actuating the regulating mechanism, an expansible and collapsible chamber surrounding the motor and operatively connected to said regulating mechanism, said chamber being subjected to the temperature of the heating medium in the furnace, and a thermostat for injecting a fluid into said motor in accordance with the temperature conditions of the ambient, said liquid being vaporized in said motor at a predetermined temperature for actuating the regulating mechanism whereby the thermostat is inoperative to actuate the regulating mechanism when the temperature of the heating medium in the furnace is below a predetermined minimum.

9. In a control device for a heating plant, regulating mechanism for controlling the effect of the heating plant, a motor for actuating the regulating mechanism having a pair of bellows one within the other, a thermostat for injecting quantities of a vaporizable liquid into the inner bellows in accordance with increases in temperature of the ambient, and means for subjecting the space between the two bellows to the temperature of the heating medium in the furnace to vaporize the fluid injected into the inner bellows when the temperature of the heating medium is above a predetermined minimum.

10. A controlling device for a heating plant comprising a movable actuating element adapted for operative connection to the controls of the plant, a motor having a plurality of expansible and contractible members connected to said actuating element and each adapted to move said element, means for expanding and contracting one of the members in accordance with variations in the temperature of the enclosure being heated, and means for expanding and contracting the other of said members in accordance with variations in the pressure of a vapor produced by the heating medium of the heating plant, said expansible and contractible members being so arranged that said first named means is dependent upon a minimum temperature condition of the member connected to said second named means.

11. A controlling device for the furnace of a heating plant comprising a movable actuating element adapted for operative connection to the controls of the furnace, a pair of bellows members connected to said actuating element and each adapted by its expansion and contraction to move said element independently of the other, one of said bellows members being located within the other, means for expanding and contracting the inner bellows member in accordance with variations in the temperature of the enclosure being heated but only when the outer bellows member has been heated to a predetermined temperature, and means for expanding and contracting the outer bellows member in accordance with variations in the pressure of a vapor produced by the heating medium of the heating plant.

12. A controlling device for the furnace of a heating plant comprising a movable actuating element adapted for operative connection to the controls of a furnace, a pair of bellows members connected to said actuating element and each adapted by its expansion and contraction to move said element independently of the other, one of said bellows members being located within the other, means for expanding and contracting one of said bellows members in accordance with variations in the temperature of the enclosure being heated but only when the other bellows member has been heated to a predetermined temperature, and means for expanding and contracting said other of said bellows members in accordance with variations in the pressure of a vapor produced by the heating medium of the heating plant.

13. In a controlling device for the furnace of a heating plant, a movable actuating element adapted for operative connection to the controls of the furnace, a motor having a pair of expansible and contractible members connected to said actuating element and each adapted by its expansion and contraction to move said element independently of the other, means for supplying a volatile liquid to the interior of one of said expansible and contractible members, and means for supplying a vapor to the interior of the other of said expansible and contractible members, the heat of said vapor being adapted to vaporize said volatile liquid, and both of said members being expanded and contracted by variations in the pressure of the vapors therein.

14. In a controlling device for the furnace of a heating plant, a movable actuating element adapted for operative connection to the controls of the furnace, a motor having a pair of expansible and contractible members connected to said actuating element and each adapted by its expansion and contraction to move said element independently of the other, means for supplying a volatile liquid to the interior of one of said members, means responsive to variations in the temperature of the enclosure being heated for actuating said liquid supply means, and means for supplying a vapor produced by the heating medium of the heating plant to the interior of the other of said members, the heat of said vapor being adapted to vaporize said volatile liquid, and both of said members being expanded and contracted by variations in the pressure of the vapors therein.

15. In a controlling device for the furnace of a heating plant, a movable actuating element adapted for operative connection to the controls of the furnace, a pair of bellows members connected to said actuating element and each adapted by its expansion and contraction to move said element independently of the other, one of said bellows members being located within the other, means for supplying a volatile liquid to the interior of the inner bellows member, and means for supplying a vapor to the interior of the outer bellows member, said volatile liquid being vaporized by the heat of the surrounding vapor, and both of said bellows members being expanded and contracted by variations in the pressure of the vapors therein.

16. In a controlling device for the furnace of a heating plant, a movable actuating element adapted for operative connection to the controls of the furnace, a pair of bellows members connected to said actuating element and each adapted by its expansion and contraction to move said element independently of the other, one of said bellows members being located within the other, means for supplying a volatile liquid to the interior of the inner bellows member, means responsive to variations in the temperature of the enclosure being heated for actuating said liquid supply means, and means for supplying a vapor produced by the heating medium of the heating plant to the interior of the outer bellows member, said volatile liquid being vaporized by the heat of the surrounding vapor, and both of said bellows members being expanded and contracted by variations in the pressure of the vapors therein.

17. In a controlling device for the furnace of a steam heating plant, a movable actuating element adapted for operative connection to the controls of the furnace, a pair of bellows members connected to said actuating element and each adapted by its expansion and contraction to move said element independently of the other, one of said bellows members being disposed inside of the other, a tube secured to the fixed end of and in communication with the interior of the outer bellows member, said tube also being adapted for communication with the steam drum of the furnace, a second tube having communication with the interior of the inner bellows member, and means responsive to variations in the temperature of the enclosure being heated for supplying a volatile liquid through said second tube to the interior of said inner bellows member whenever said temperature reaches a predetermined degree, the heat of the steam in said outer bellows member being adapted to vaporize said volatile liquid.

18. In a controlling device for the furnace of a hot water heating plant, a movable actuating element adapted for operative connection to the controls of the furnace, a pair of bellows members connected to said actuating element and each adapted by its expansion and contraction to move said element independently of the other, one of said bellows members being disposed inside of the other, a bulb containing a volatile liquid secured to the fixed end of and in communication with the interior of the outer bellows member, said bulb also being adapted for contact with the hot water of the furnace whereby said volatile liquid may be vaporized, a tube having communication with the interior of the inner bellows member, and means responsive to variations in the temperature of the enclosure being heated for supplying a second volatile liquid through said tube to the interior of said bellows member whenever said temperature reaches a predetermined degree, the heat of the vapor in said outer bellows member being adapted to vaporize said second volatile liquid.

19. A controlling device for the furnace of a heating plant comprising a movable actuating element adapted for operative connection to the controls of the furnace, a pair of bellows members connected to said actuating element and each adapted by its expansion and contraction to move said element independently of the other, means for supplying a vapor produced by the heating medium of the heating plant to the interior of one of said bellows members, and means responsive to variations in the temperature of the enclosure being heated for supplying a volatile liquid to the interior of the other of said bellows members, the heat of said vapor in the first bellows member being adapted to vaporize said volatile liquid, said last named means comprising a sealed liquid-containing system including said second bellows member, a tube connected thereto and a third bellows member to which said tube is also connected, a supply of volatile liquid normally contained entirely within said tube and said third bellows member, and a temperature responsive device for contracting and expanding said third bellows member and thereby forcing a quantity of said volatile liquid from and into said tube into and from said second bellows member.

20. In a control device for a heating apparatus, regulating mechanism for controlling the effect of said apparatus, a pair of expansible and collapsible motor elements having a common movable member operatively connected to said mechanism, and means connecting said motor elements respectively to different sources of temperature control, said motor elements being so arranged that one constitutes a heating element for the other whereby the latter is effective only when the heating element is at a predetermined minimum temperature.

21. In a control device for a heating apparatus, regulating mechanism for controlling the effect of said apparatus, a pair of expansible and collapsible motor elements having a common movable member operatively connected to said mechanism, means for operating one of said motor elements from the heating medium, and means for injecting a vaporizable fluid into the other of said elements upon predetermined increases in the temperature of the ambient to be heated, said motor elements being so arranged that one constitutes a heating element for the other whereby the latter is effective only when the heating element is at a predetermined minimum temperature.

JEAN V. GIESLER.